(12) United States Patent
Fiora et al.

(10) Patent No.: US 6,480,398 B1
(45) Date of Patent: Nov. 12, 2002

(54) CPU EASY ACCESS PANELS

(75) Inventors: Troy Anthony Della Fiora, Spring; Kevin L. Massaro, Houston; Kevin W. Mundt, Spring, all of TX (US)

(73) Assignee: Compaq Computer Corporation, Houston, TX (US)

(*) Notice: Subject to any disclaimer, the term of this patent is extended or adjusted under 35 U.S.C. 154(b) by 0 days.

(21) Appl. No.: 09/478,141

(22) Filed: Jan. 5, 2000

(51) Int. Cl.[7] ................ H05K 7/14; H05K 9/00
(52) U.S. Cl. ............ 361/816; 361/683; 361/753; 312/223.2; 174/35 R
(58) Field of Search ................ 361/683, 752, 361/753, 800, 801, 816, 818; 312/223.2; 174/35 R, 35 GC, 35 MS

(56) References Cited

U.S. PATENT DOCUMENTS

| | | |
|---|---|---|
| 3,779,623 A | 12/1973 | Motohashi |
| 4,479,198 A | 10/1984 | Romano et al. |
| 4,479,263 A | 10/1984 | Rowenfeldt et al. |
| 4,772,079 A | 9/1988 | Douglas et al. |
| 4,949,934 A | 8/1990 | Krenz et al. |
| 4,977,532 A | 12/1990 | Borkowicz et al. |
| 5,164,886 A | 11/1992 | Chang |
| 5,197,789 A | 3/1993 | Lin |
| 5,208,722 A | 5/1993 | Ryan et al. |
| 5,262,923 A | 11/1993 | Batta et al. |
| 5,269,598 A | 12/1993 | Liu |
| 5,277,615 A | 1/1994 | Hastings et al. |
| 5,278,351 A | 1/1994 | Herrick |
| 5,340,340 A | 8/1994 | Hastings et al. |
| 5,397,176 A | 3/1995 | Allen et al. |
| 5,420,760 A * | 5/1995 | Ansell et al. ........... 361/818 |
| 5,438,476 A | 8/1995 | Steffes |
| 5,460,441 A | 10/1995 | Hastings et al. |
| 5,469,037 A | 11/1995 | McMurtrey, Sr. et al. |
| 5,491,611 A | 2/1996 | Stewart et al. |
| 5,495,389 A | 2/1996 | Dewitt et al. |
| 5,571,256 A | 11/1996 | Good et al. |
| 5,572,402 A | 11/1996 | Jeong |
| 5,598,318 A | 1/1997 | Dewitt et al. |
| 5,646,823 A * | 7/1997 | Amori ................ 361/695 |

(List continued on next page.)

OTHER PUBLICATIONS

*COMPAQ Typhoon Mechanical Specification*, Version 0.01, Nov. 8, 1994 by Joseph Allen, Systems Division of Compaq Computer Corporation, 15 pages.

(List continued on next page.)

Primary Examiner—Jayprakash N. Gandhi
(74) Attorney, Agent, or Firm—Akin, Gump, Strauss, Hauer & Feld, LLP

(57) ABSTRACT

A computer system includes a frame for attaching a plurality of electronic components including a predetermined electronic component. A cover for covering the electronic components is provided along with a mask having an opening. The mask is disposed between the frame and the cover so that a mask opening allows access to the predetermined electronic component while masking other electronic components. The cover includes an access cover panel that is released using a single button and pivoted for removal from the frame. The one-piece access cover panel is fabricated from a single piece of plastic and includes alignment tabs, pivot tabs, and snaps for attaching the access cover panel with the cover. Additionally, a metal shield is attached to the access cover panel for simultaneously shielding the predetermined electronic component when attaching the access cover panel to the cover. The metal shield reduces electromagnetic interference ("EMI"). Advantageously, a method for accessing an electronic component attached to a frame in a computer is provided.

20 Claims, 17 Drawing Sheets

U.S. PATENT DOCUMENTS

| | | | |
|---|---|---|---|
| 5,684,671 A | | 11/1997 | Hobbs et al. |
| 5,717,575 A | | 2/1998 | Copeland et al. |
| 5,726,866 A | | 3/1998 | Allen |
| 5,734,557 A | | 3/1998 | McAnally et al. |
| 5,737,184 A | | 4/1998 | Lai |
| 5,743,606 A | | 4/1998 | Scholder |
| 5,768,097 A | | 6/1998 | Jelinger |
| 5,784,251 A | | 7/1998 | Miller et al. |
| 5,784,252 A | | 7/1998 | Villa et al. |
| 5,785,398 A | | 7/1998 | Park |
| 5,823,644 A | | 10/1998 | Sub et al. |
| 5,839,804 A | * | 11/1998 | Ho .......................... 312/223.2 |
| 5,967,633 A | * | 10/1999 | Jung ........................ 312/223.2 |
| 6,134,116 A | * | 10/2000 | Hoss et al. ................. 361/747 |

OTHER PUBLICATIONS

*Universal, Low–Cost Hard–File Mounting Assembly*, IBM Technical Disclosure Bulletin, vol. 28, No. 6, Nov. 1985, 2 pages.

*Spring–Loaded File Rails*, IBM Technical Disclosure Bulletin, vol. 28, No. 12, May 1986, 3 pages.

*Bridge Assembly for Mounting Interchangeable Electromagnetic Devices*, IBM Technical Disclosure Bulletin, vol. 29, NO. 9, Feb. 1987, 2 pages.

*Direct–Access Storage Device Commodity–Stacking Plates*, IBM Technical Disclosure Bulletin, vol. 30, No. 1, Jun. 1987, 2 pages.

Dell® OptiPlex® Gxi Midsize Systems Reference and Installation Guide, © 1991–1996 Dell Computer Corporation. Sep. 1996 P/N 50577. In particular, see Fig. 1–2 "Security Cable Slot" on p. 1–4; pp. 5–2 and 5–3 regarding Removing the Computer Cover; p. 5–4 to 5–8 regarding "Inside Your Computer" p. 5–11 regarding "Removing and Replacing the Expansion–Card Cage"; pp. 5–11 and 5–12 regarding "Rotating the Power Supply Away from the System Board." and photos, including.

A 5×7 color photograph shows the actuation of one of the buttons positioned on each side of the computer cover of the Dell® OptiPlex® Gxi Midsize Systems referred to in "I" above.

A 5×7 color photograph shows rotating the cover about the front of the computer upon releasing the engagement between the cover and the frame after being actuated by one of the buttons positioned on each side of the computer housing.

A 5×7 color photograph of the engagement means on the side of the computer frame shown in photo 12.

A 5×7 color photograph showing two overlapped photos—one of the engagement means inside of the computer cover for one of the buttons actuated in photographs I1 and I2. Also, overlapped is a photo of the bottom of the power supply that has no power connection, as referred to on pp. 5–11 and 5–12 of "I" regarding "Rotating the Power Supply Away from the System Board".

Walter S. Mossberg, *Compaq'New Series Has Quaint Old Look*, Wall Street Journal, Jan. 6, 2000, 4 pages.

Dwight Silverman, *Compaq's PC defies description*, Houston Chronicle, Jan. 5, 2000, 2 pages.

Turbocharging Donnelley, Apple Computer, Inc., http://www.apple.com/creative/ama/0201/turbo/, 2000, 4 pages.

IMac Data Sheet, Apple Computer, Inc., http://www.apple.com/imac/pdf/iMac_DS–a.pdf 1999, 4 pages.

IMac Features, Apple Computer, Inc. http://www.apple.com/imac/features.html, 2000, 4 pages.

* cited by examiner

CPU EASY ACCESS PANELS

CROSS-REFERENCE TO RELATED APPLICATIONS

The following related applications filed on even date with the present application are hereby incorporated by reference for all purposes:

U.S. Patent Application, U.S. application Ser. No. 29/116, 545, now U.S. Pat. No. D439,248, issued Mar. 20, 2001, entitled EASY ACCESS TOWER COMPUTER, filed Jan. 5, 2000 by Kevin L. Massaro, Stacy L. Wolff, and Anthony B. Rorke.

U.S. Patent Application, U.S. application Ser. No. 09/478, 153 entitled DIGITAL FEEDBACK DISPLAY PANEL AND SUPPORTING SOFTWARE FOR A COMPUTER USER, filed Jan. 5, 2000 by Kevin L. Massaro, Brooks A. Rorke, Stacy L. Wolff, Ajay Chaturvedi, Valiuddin Y. Ali, John Stivoric, and Eric Teller.

U.S. Patent Application, U.S. application Ser. No. 29/116, 559, now U.S. Pat. No. D448,173 entitled PERSONAL COMPUTER DASHBOARD, filed Jan. 5, 2000 by Kevin L. Massaro, Stacy L. Wolff, and Anthony B. Rorke.

STATEMENT REGARDING FEDERALLY SPONSORED RESEARCH

Not applicable.

BACKGROUND OF THE INVENTION

1. Field of the Invention

The present invention relates to a computer system and, particularly, an access cover panel covering a mask disposed between the access cover panel and a frame of the computer system.

2. Description of the Related Art

Personal computers are generally comprised of three physical components. First, there is the main system unit or central processing unit ("CPU") which holds most of the computer internals, such as power supplies, circuit boards including slots for memory cards and modem cards, and drive units including hard drives. A keyboard is used for data entry and a monitor having a display screen is provided for the display of data. All three of these components can be arranged on a desktop with the keyboard placed in front of the system unit and the monitor placed on top of the system unit. This desktop arrangement is, of course, well known. In one typical desktop arrangement, a one-piece U-shaped cover of the main system unit has hooks on each of its ends that are received in slots in the bottom sides of a frame or chassis of the main system unit. Once the hooks are received in the slots, the cover is slid until the cover engages the frame. Fasteners, such as screws, have been used to fasten the rear of the cover to the frame. U.S. Pat. No. 5,743,606 proposes another desktop computer cabinet latching mechanism that includes two buttons to release the cover from the frame at one end and a hinge at the other end that allows the cover to be pivoted up and away from the frame. Conventionally, when the cover is opened in the above desktop computer systems, most, if not all, of the electronic components are accessible and in view of the user.

When it is desired to minimize the desk surface area required for a personal computer, the system unit has been placed on the floor next to a desk or table. In this arrangement, the system unit is generally a rectangular box and is designed to stand with the longest axis in the vertical direction on the floor. These systems are called "tower units". In this arrangement, a one-piece U-shaped cover is attached to the chassis or frame using fasteners, such as screws. U.S. Pat. Nos. 5,397,176 and 5,491,611, assigned to the assignee of the present invention, disclose tower units having a two-piece cover including a user panel and a J-shaped service panel. In this arrangement, the user panel is proposed to be removed to allow access to the circuit boards while the service panel remains attached to the frame. The service panel is removed to provide access to power supply and drive units, such as floppy drives, hard drives and tape drives. However, in the above tower units, even when only the user panel is removed, many of the electronic components, including wiring, are accessible and in view of the user.

As users are becoming more accustomed to computer systems, it is contemplated that users will perform upgrades and replacements of subassemblies and cards in their computers. To facilitate upgrading and replacement of these subassemblies, cards and other user-friendly components, while maintaining the desired shielding from electromagnetic interference ("EMI") in a computer system, a computer system having a cover panel with a protective shield from EMI for easy access to predetermined electronic components is desired. Furthermore, a computer system that includes a mask disposed between the frame and the access cover panel to allow access to predetermined electronic components while masking other electronic components would facilitate user upgrades and replacement in predetermined electronic component areas in a computer system.

SUMMARY OF THE INVENTION

A computer system or unit, including a frame for attaching a plurality of electronic components including a predetermined electronic component, is disclosed. A cover for covering the electronic components is provided along with a mask having an opening. The mask is disposed between the frame and the cover so that the mask opening allows access to the predetermined electronic component while masking other electronic components. The cover includes an access cover panel that is released using a single button and pivoted for removal from the unit. The one-piece access cover panel is fabricated from plastic and includes alignment tabs, pivot tabs, and snaps for attaching the cover panel with the cover. Additionally, a metal shield is attached to the access cover panel for simultaneously shielding the predetermined electronic component when attaching the access cover panel to the cover. This shield desirably reduces electromagnetic interference ("EMI"). Advantageously, a method for accessing an electronic component attached to a frame in a computer is disclosed.

These features of the invention are not necessarily the only features that will be disclosed in the specification. Additionally, the features of the invention have been described herein in a summary fashion. It is not the intent to disclose all of the features nor the true scope of the invention within this Summary of the Invention.

The specification will describe the details of this invention for the understanding of those skilled in the art and the claims will describe the actual scope of the invention.

BRIEF DESCRIPTION OF THE DRAWINGS

A better understanding of the invention can be obtained when the following detailed description of the preferred embodiment is considered in conjunction with the following drawing in which.

DETAILED DESCRIPTION OF INVENTION

Figure 1:
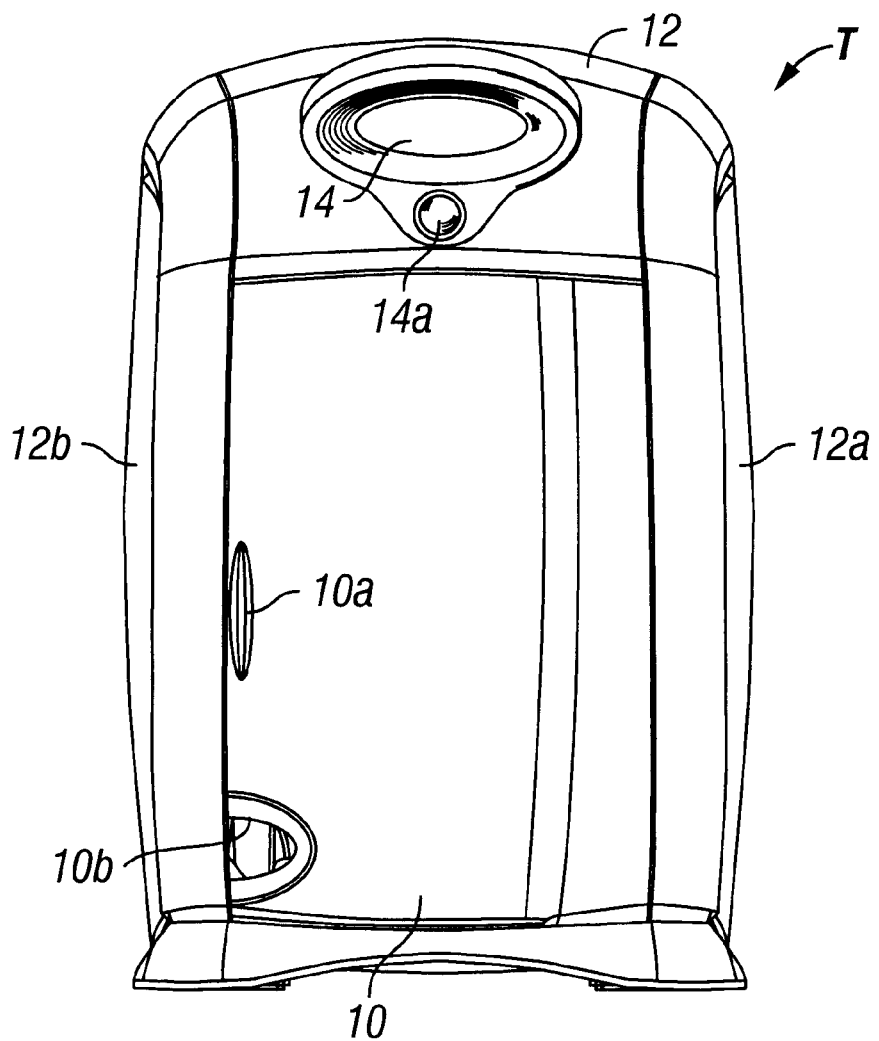
FIG. 1 is a front elevational view of the tower unit of the present invention.

Referring to the drawings, the "T" generally designates a tower unit or system of the present invention. Although the tower unit T is disclosed, it is to be understood that the present invention could be used with a typical desktop main system unit as discussed in the Background of the Invention. As can be seen in the figures, the tower unit T of the present invention includes ornamental features and the concurrently filed copending applications for the ornamental features of the tower unit are incorporated herein for all purposes. Additionally, U.S. Pat. Nos. 5,397,176, 5,491,611 and 5,743,606, discussed in the Background of the Invention, are incorporated herein for all purposes.

Figure 2:
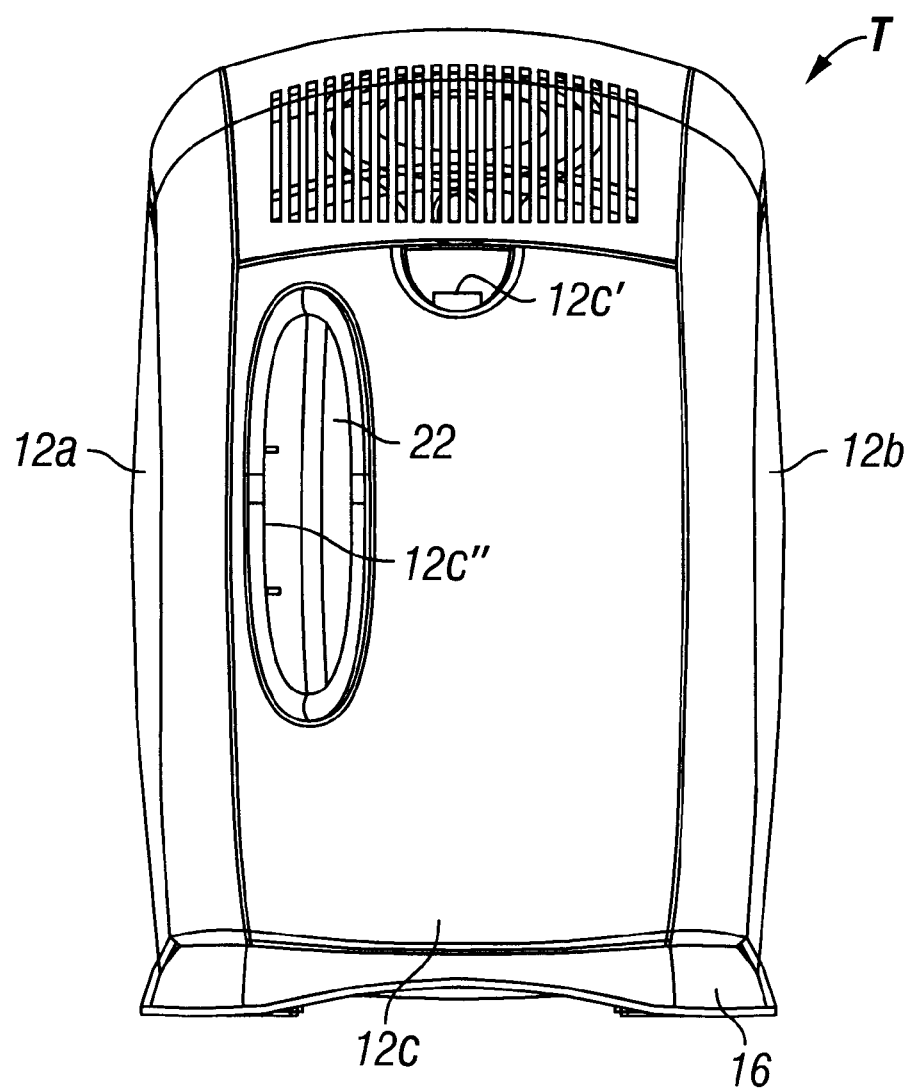
FIG. 2 is a rear elevational view of the tower unit of the present invention.
Figure 3:
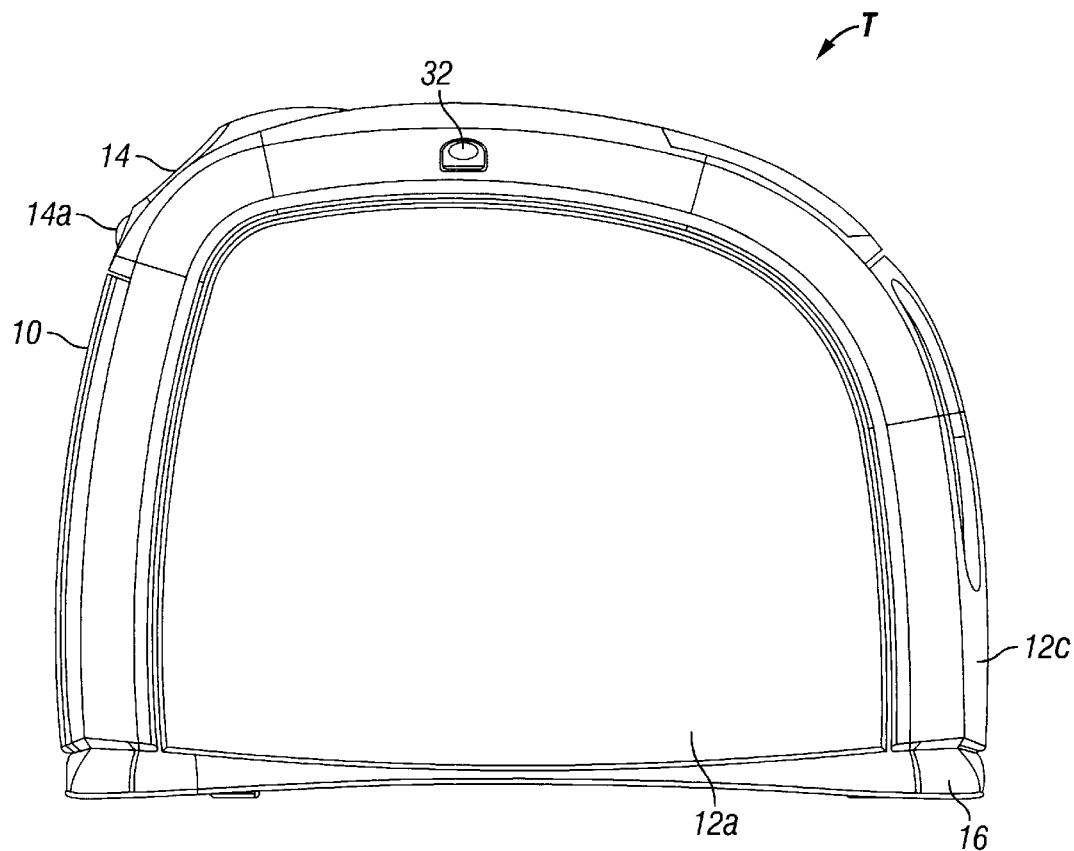
FIG. 3 is a side elevational view of the tower unit of the present invention.
Figure 4:
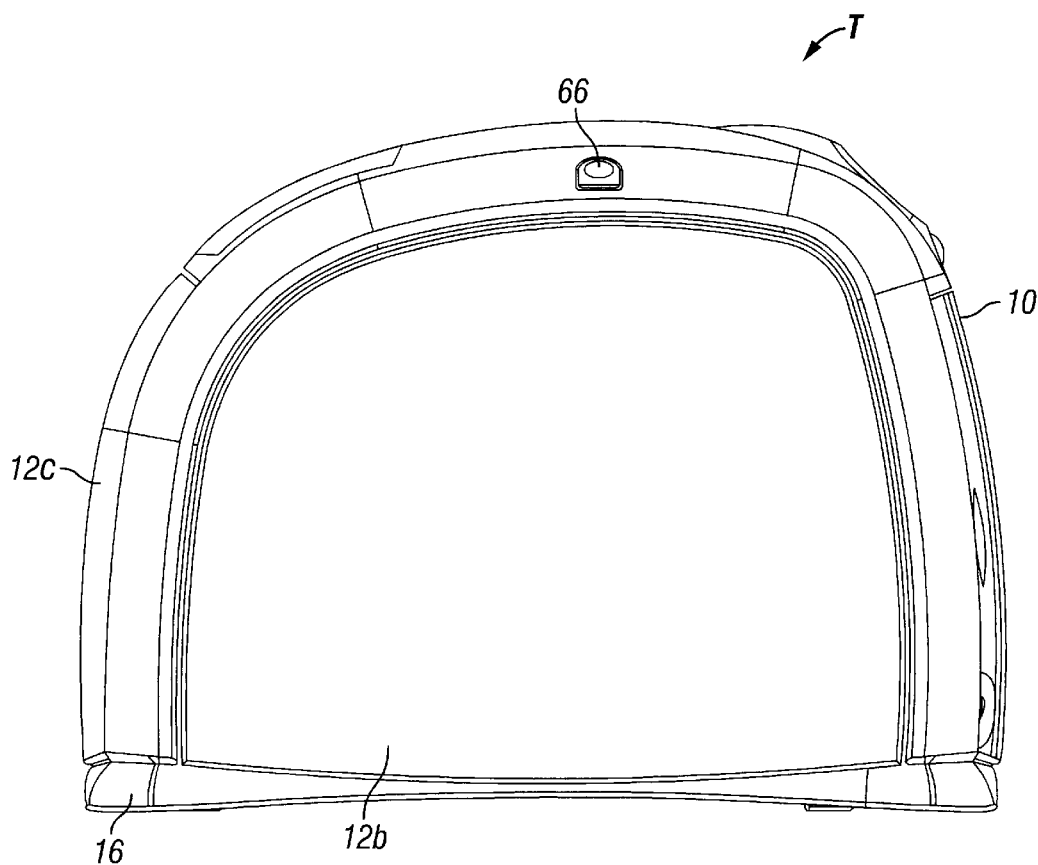
FIG. 4 is another side elevational view of the tower unit of the present invention.
Figure 5:
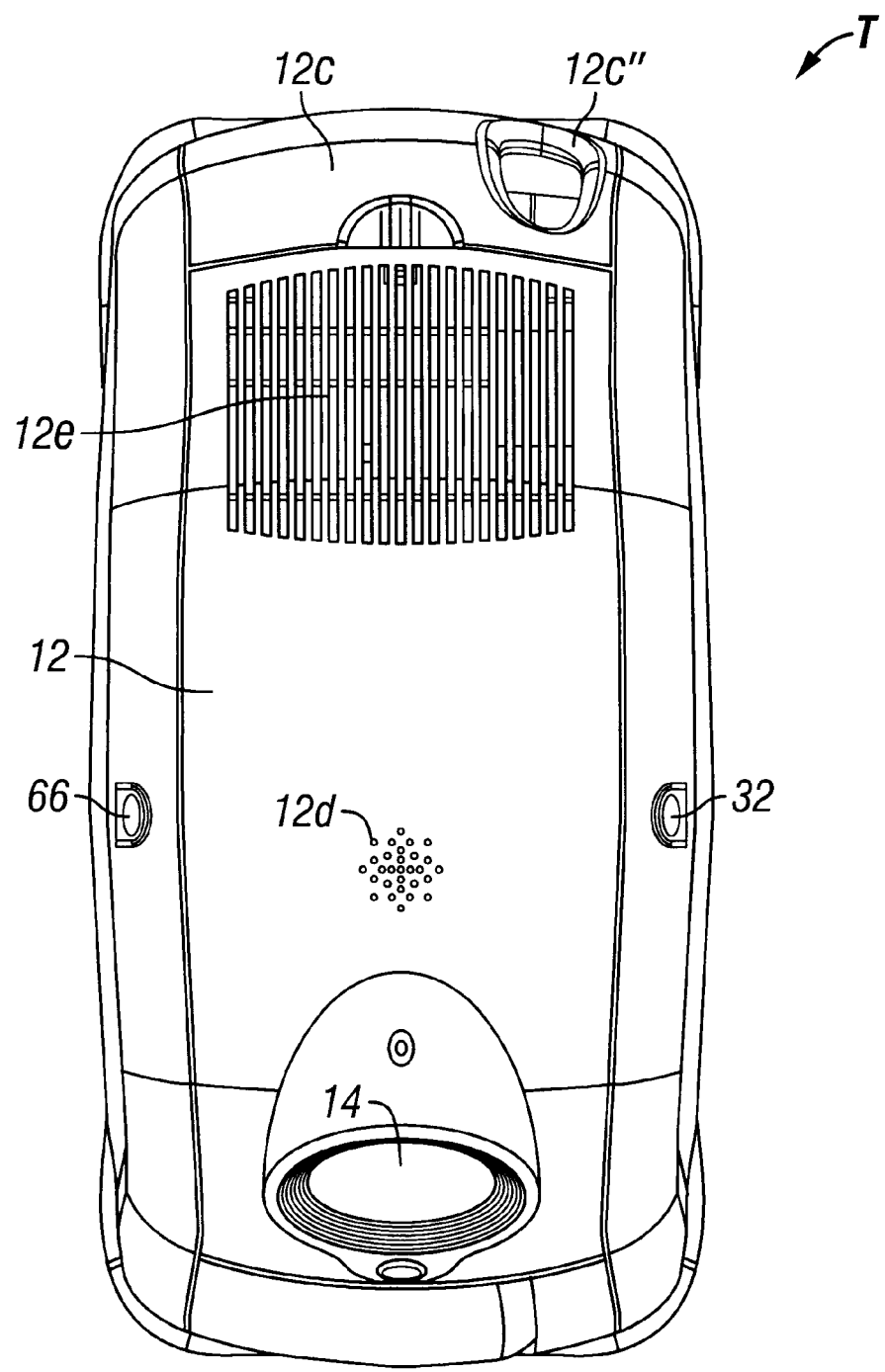
FIG. 5 is a plan view of the tower unit of the present invention.
Figure 6:
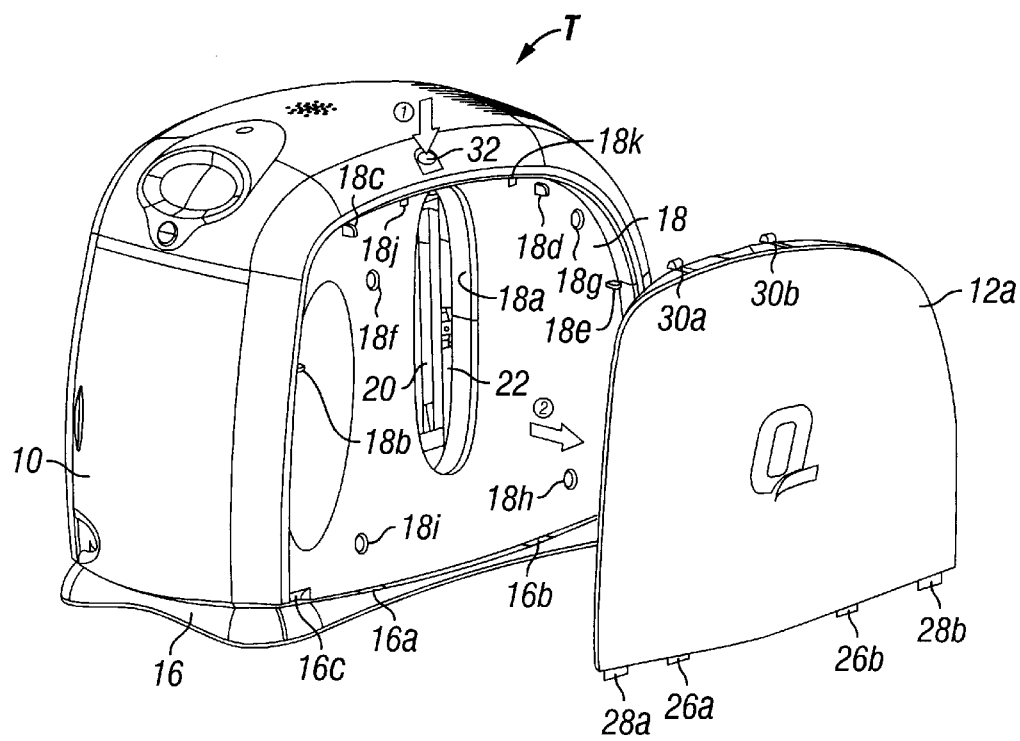
FIG. 6 is a perspective view of the tower unit of the present invention illustrating the depression of a single button for release of the access cover panel from the tower unit.
Figure 9:
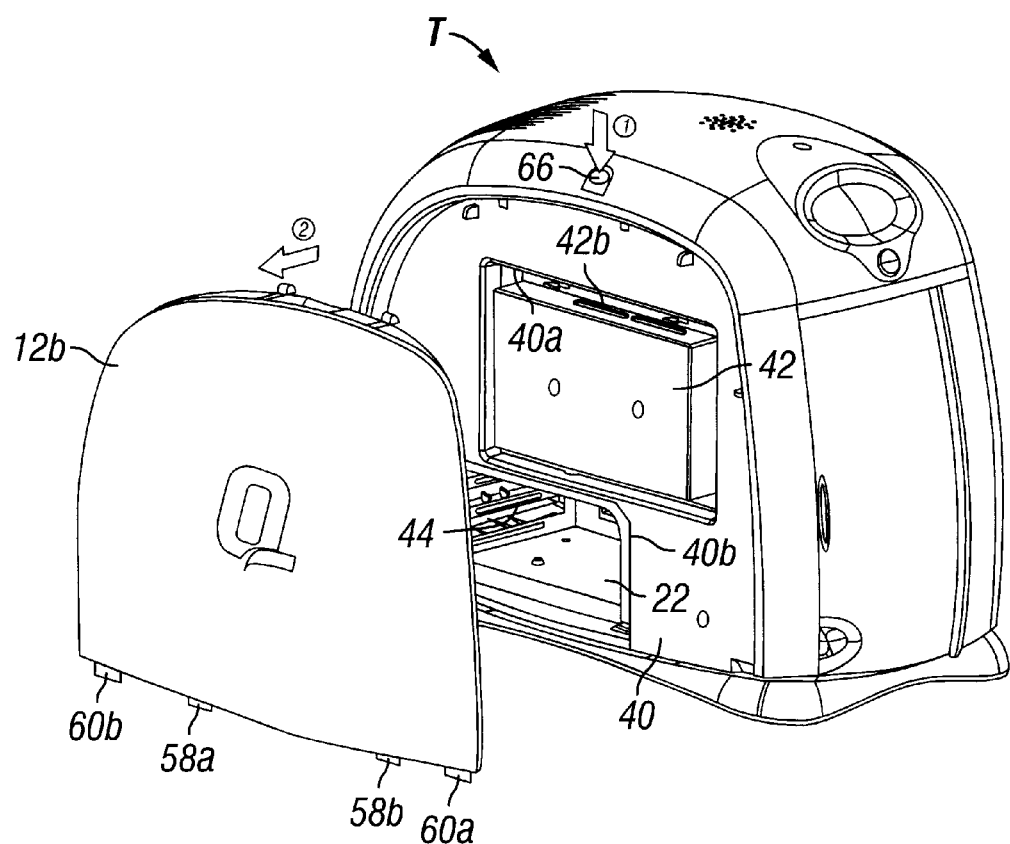
FIG. 9 is a perspective view of the opposed side of the tower unit shown in FIG. 6 where the other access cover panel is released from the tower unit by depression of a single button to allow access to a hard drive and PCI slots for receiving, among other cards, a modem card.
Figure 11:
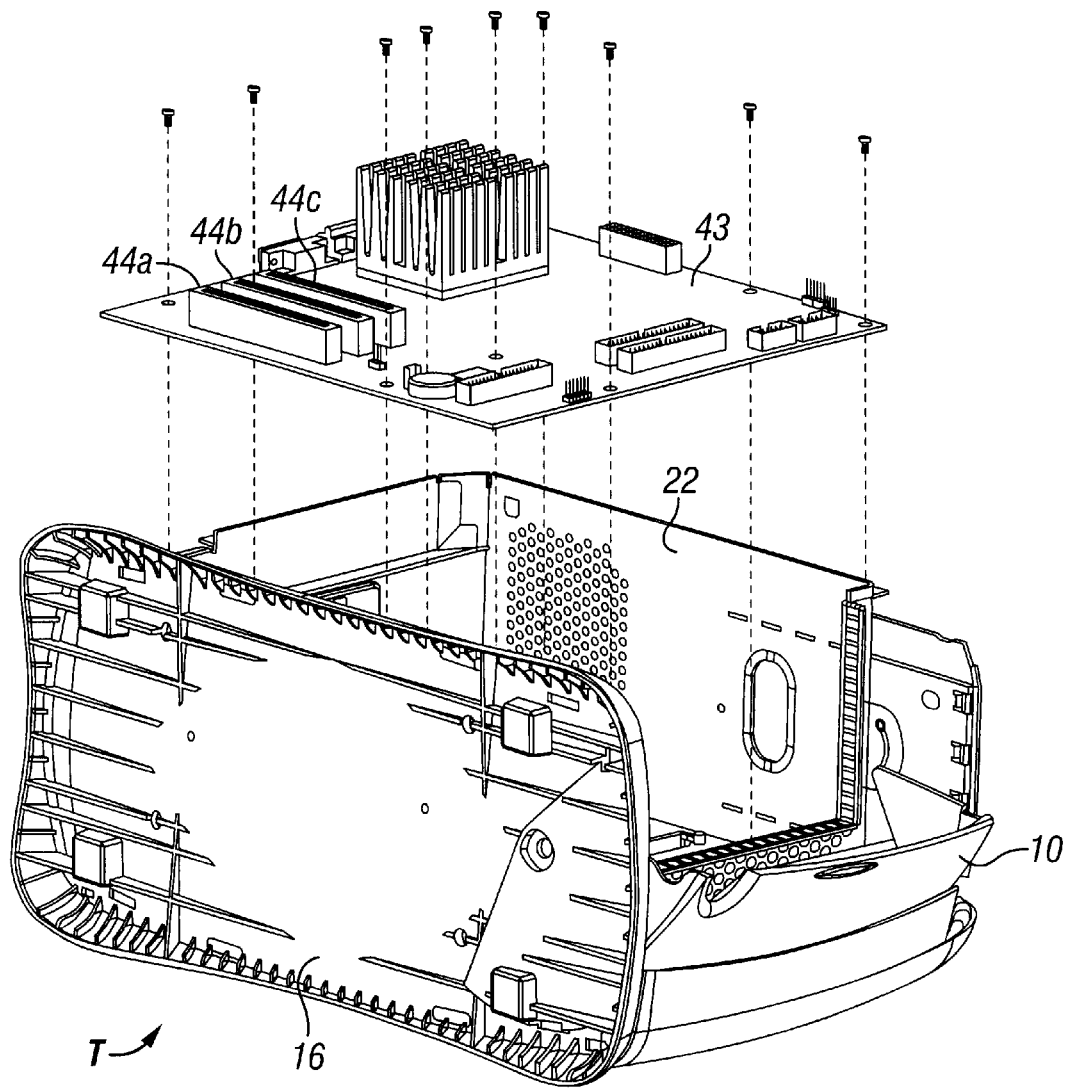
FIG. 11 is an exploded view of the motherboard, or system board, of the computer system of the present invention that illustrates the preferred positioning of the PCI slots relative to the opening in the mask shown in FIG. 9.
Figure 13:
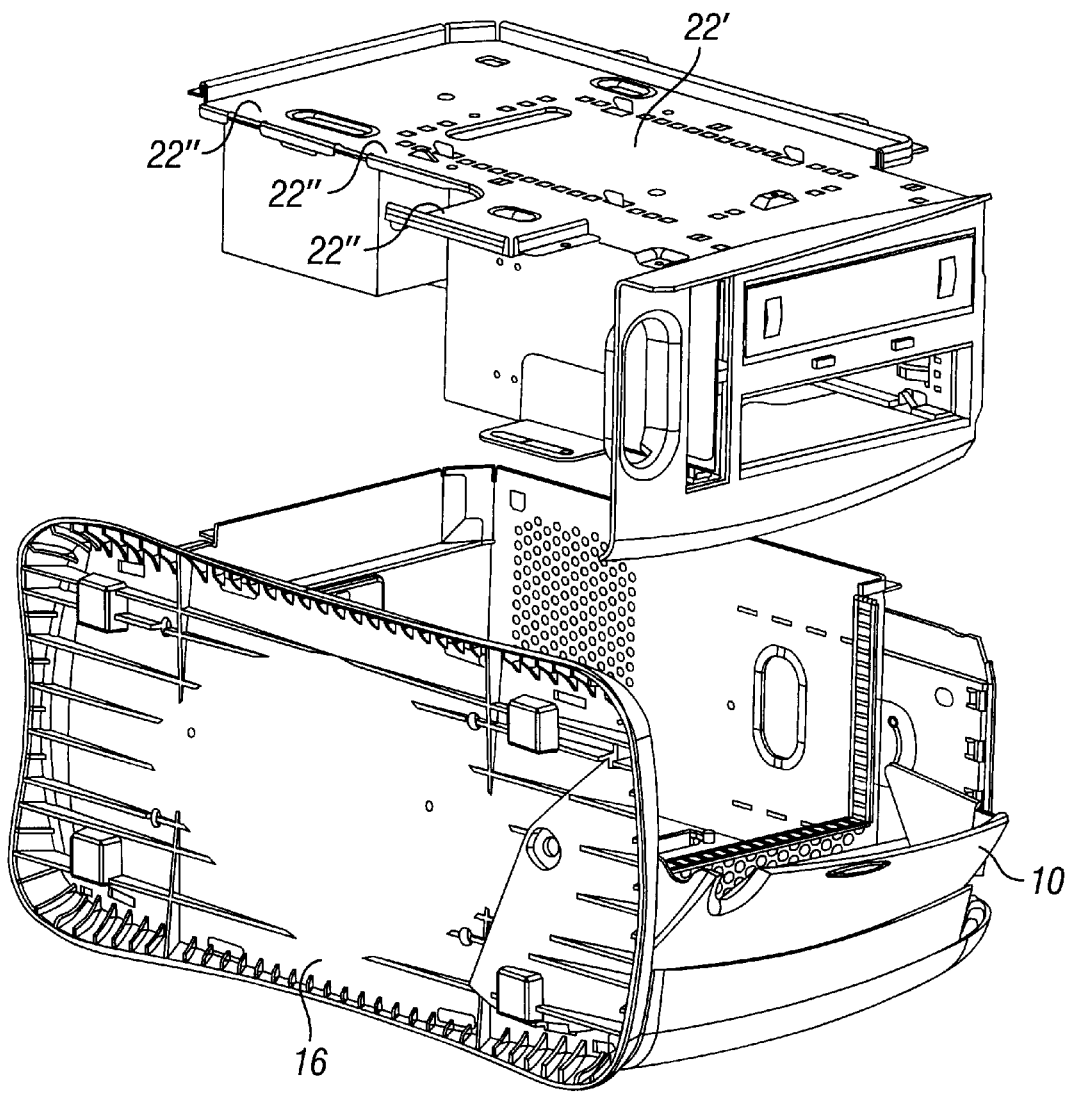
FIG. 13 is an exploded view showing the opening in the frame for access to the PCI slots shown in FIG. 6.

As best illustrated in FIG. 1, the tower unit T includes a front bezel or door 10, and a cover 12 including access cover panel 12A, as best shown in FIGS. 3 and 6, access cover panel 12B, as best shown in FIGS. 4 and 9, and a rear bezel 12C, as best shown in FIGS. 2 and 5. As best shown in FIGS. 11 and 13, the front bezel 10 includes a handle 10A that allows the bezel or door 10 to rotate to an open position for access to connectors, floppy disk drive slots, CD players and writers, and other desired electronic components. Opening 10B is provided in bezel or door 10 to allow cables to extend outwardly from the front of the main unit T.

Figure 1A:
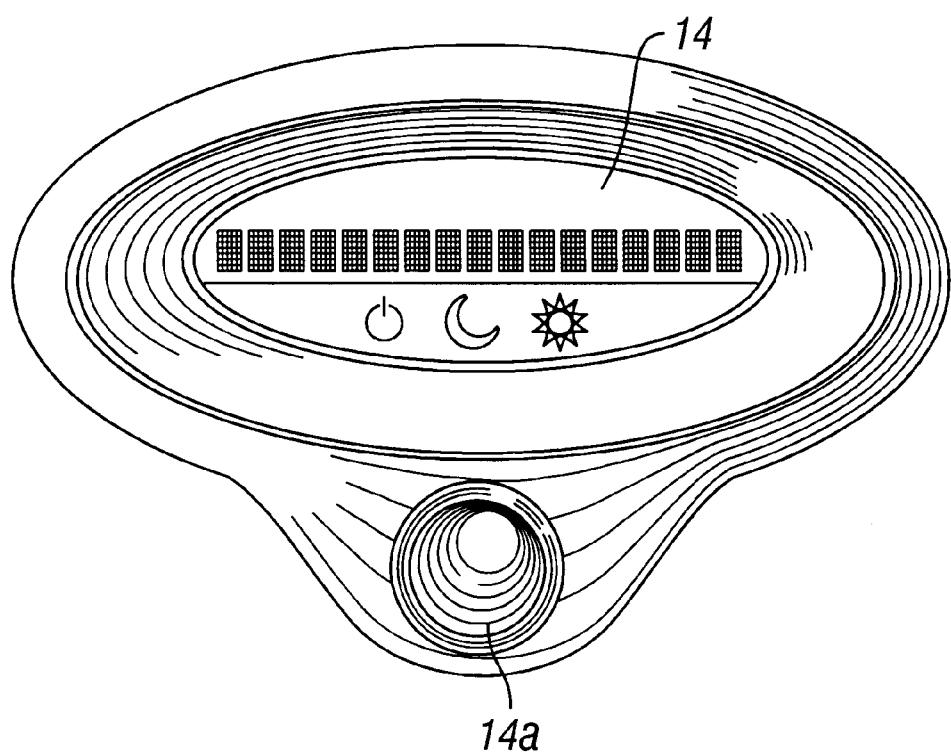
FIG. 1A is a detail of the personal computer digital feedback display illustrated in FIG. 1.

Additionally, as best shown in FIGS. 1 and 1A, a personal computer digital feedback display 14 is provided in the tower unit T. This display 14 and activation button 14A, are the subject of the above identified copending patent application entitled Digital Feedback Display Panel and Supporting Software for a Computer User, that is assigned to the assignee of the present invention, and is incorporated herein for all purposes.

Turning now to FIG. 5, the cover 12 includes speaker holes 12D for providing audio from a speaker attached beneath the cover 12. Also, elongated slots 12E are provided adjacent the rear of the cover 12 for cooling of the system unit T. As best shown in FIGS. 2 and 5, the rear bezel 12C is removable by pressing downwardly on member 12C' and includes a cable management oval opening 12C" for connection of cables, such as a power cable, and a monitor cable, with the electronic components connectors in the frame 22. The base 16, as best shown in FIGS. 1 to 8, preferably fabricated from plastic, is attached to the frame 22 and includes radially outwardly extending portions to provide stability to the unit T.

Figure 7:
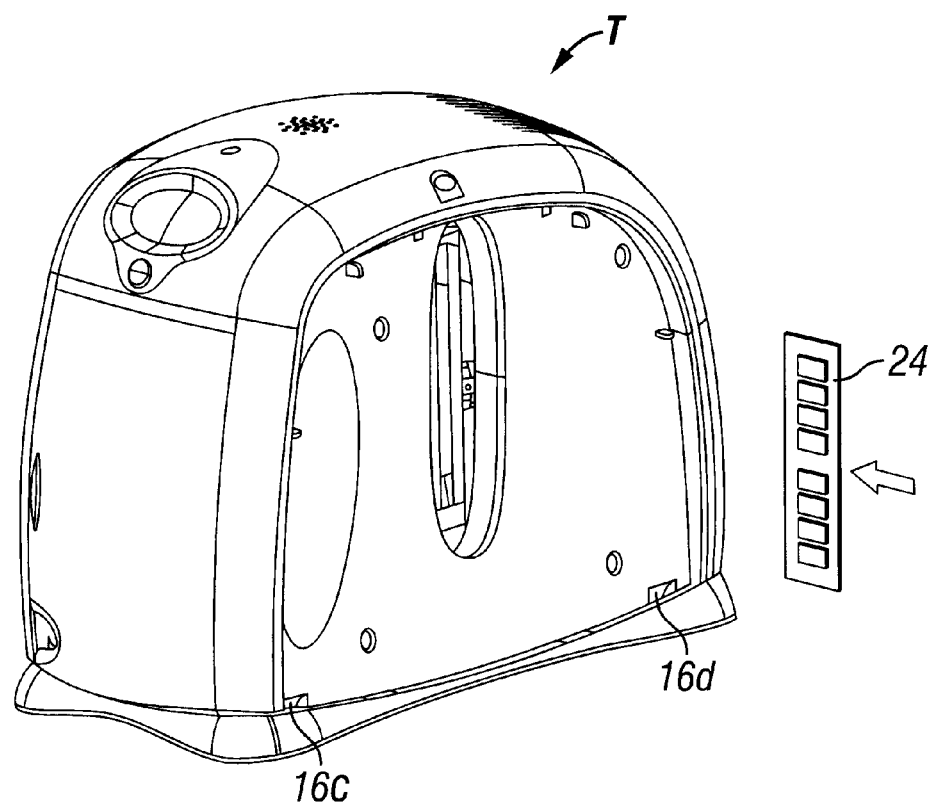
FIG. 7 is a view similar to FIG. 6, with the access cover panel removed and a memory card aligned for positioning in a slot attached to the frame where the slot is positioned within an opening of a mask of the present invention.
Figure 14:
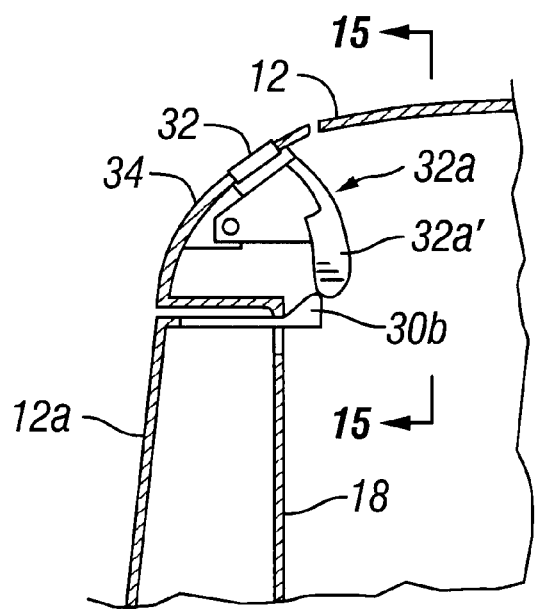
FIG. 14 is a detail view of the button mechanism for release of the access cover panels of the present invention.
Figure 15:
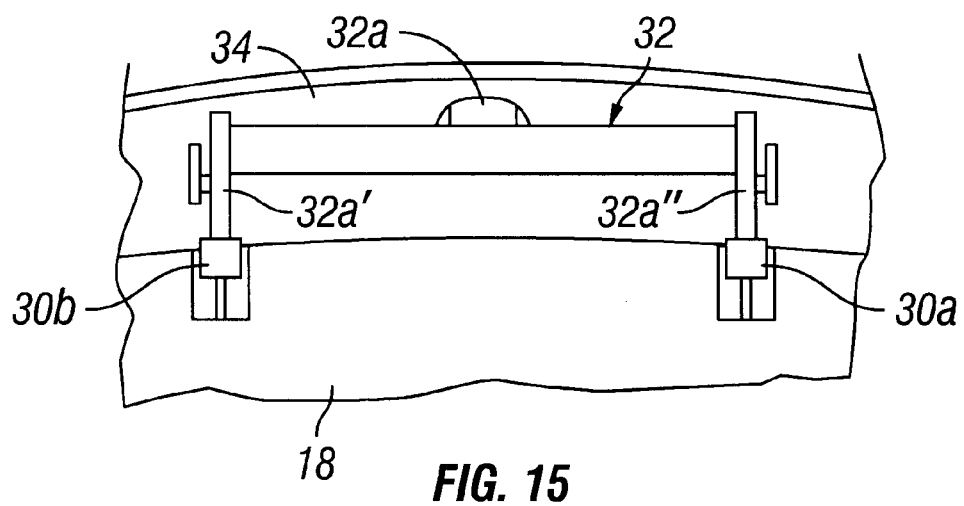
FIG. 15 is a section taken along line 15—15 of FIG. 14.
Figure 16:
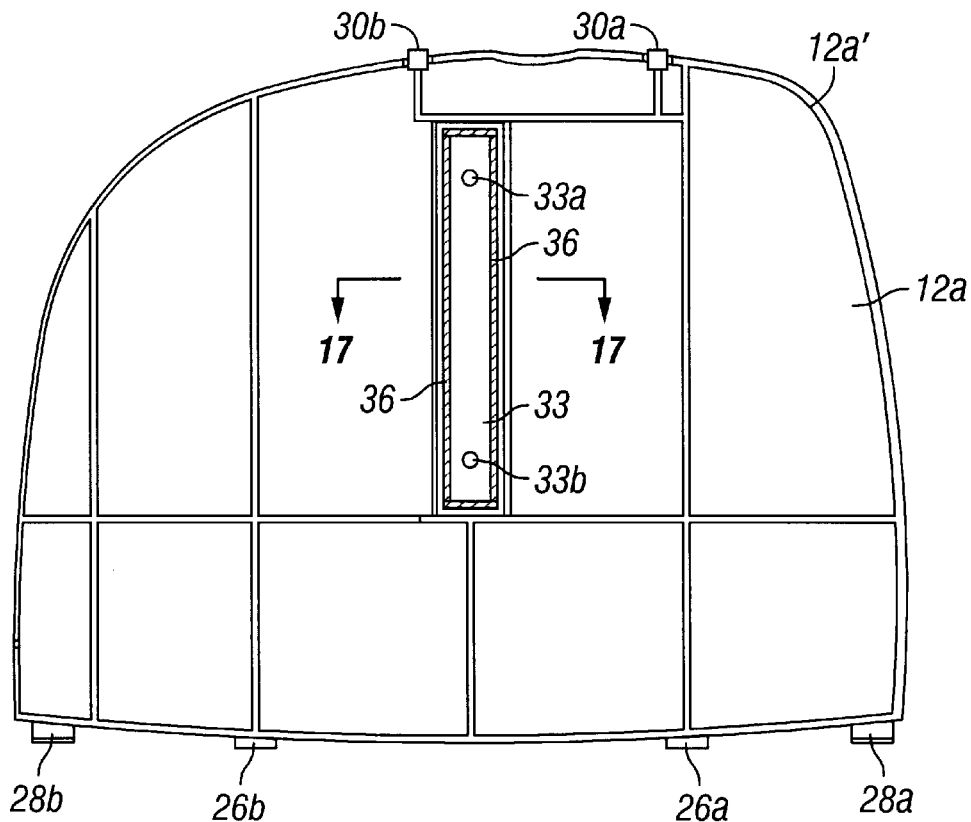
FIG. 16 is an enlarged detail view of the inside of the access cover panel having a shield for the memory card slot.
Figure 19:
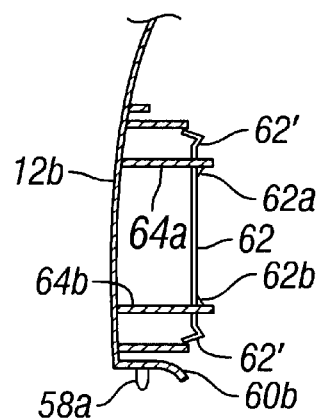
FIG. 19 is a section view taken along line 19—19 of FIG. 18.

FIG. 6 discloses the mask 18, having an elongated oval-shaped opening 18A. The oval-shaped opening 18A is sized and aligned with a plurality of memory card slots, generally indicated at 20, that are attached to the frame 22. The mask 18 is disposed between the frame 22 and the access cover panel 12A of cover 12. Mask 18 indicates to the user the area for the upgrading and replacement of memory cards, such as memory card 24, shown in FIG. 7, while other electronic components besides the predetermined component or memory card slots 20 are removed from view by the user, thereby eliminating access by the user of these other components. The access cover panel 12A is preferably a monolithic plastic member with pivot tabs 26A and 26B, corresponding to indentations 16A and 16B in the base 16; alignment tabs 28A and 28B corresponding with openings 16C and 16D in base 16, as best shown in FIGS. 6 and 7; and elastic finger connectors or snaps 30A and 30B, as best shown in FIGS. 6, 14 and 15. As best shown in FIGS. 19, these tabs 28A and 28B, similar to tab 60B, are curved, so that upon pivoting the panel 12A relative to the mask 18, they secure the panel 12A to the unit T. Additionally, a number of alignment tabs 18B, 18C, 18D and 18E, as best shown in FIG. 6, are provided to cooperate with the edge 12A' of the cover panel 12A, as best shown in FIGS. 6 and 16, to assist in alignment and securement of the panel 12A with the unit T. Also, counterbore holes 18F, 18G, 18H and 18I are provided in the mask 18 for securing the mask 18 to the frame 22 with conventional metal screws (not shown).

As best shown in FIGS. 6, 14 and 15, the snaps 30A and 30B, discussed above, are received in respective openings 18J and 18K in mask 18 for securing the panel 12A to the unit T. As best shown in FIGS. 14 and 15, the one piece button mechanism 32A includes a button 32 having two ends 32A' and 32A" that pivot internally on the mask border 34. The two ends 32A' and 32A" move the snaps 30B and 30A, respectively, downwardly and outwardly so as to release the top of the panel 12A from the unit T. The panel 12A then pivots outwardly about the pivot tabs 26A and 26B and alignment tabs 28A and 28B relative to the base 16 so as to clear a metal shield 33, as discussed below, from the protruding memory card 24.

Figure 17:
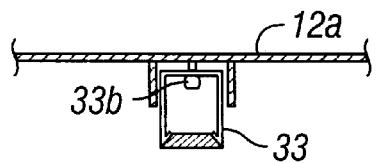
FIG. 17 is a section view taken along line 17—17 of FIG. 16.

As best shown in FIGS. 16 and 17, the metal shield 33, generally rectangular-shaped, is preferably attached by heat staking protuberances 33A and 33B, molded with panel 12A, after they are received in openings in the metal shield 33 to affix the metal shield 33 to the panel 12A. The metal shield 33 is sized and positioned so that it aligns with the memory card slots 20 so that upon attaching the panel 12A to the tower unit T, the exposed memory cards 24 and memory card slots 20 are shielded by shield 33 to reduce electromagnetic interference ("EMI"). The memory card slots 20 preferably include quick release tabs for ease of installation and release of the memory cards. For example, it is contemplated that system unit T could be provided initially with only one memory card 24 having 64 megabytes of memory. If the user desired to subsequently upgrade to 128 megabytes of memory, then an additional 64 megabyte card could be added in one of the other memory card slots 20, thereby giving a total of 128 megabytes of memory for the system unit T.

Returning to FIGS. 16 and 17, the metal shield 33 includes a number of tabs 36 about the metal shield 33 edge to provide a friction fit with a metal border of the frame extending around the memory card slots 20 to reduce EMI.

Figure 8:
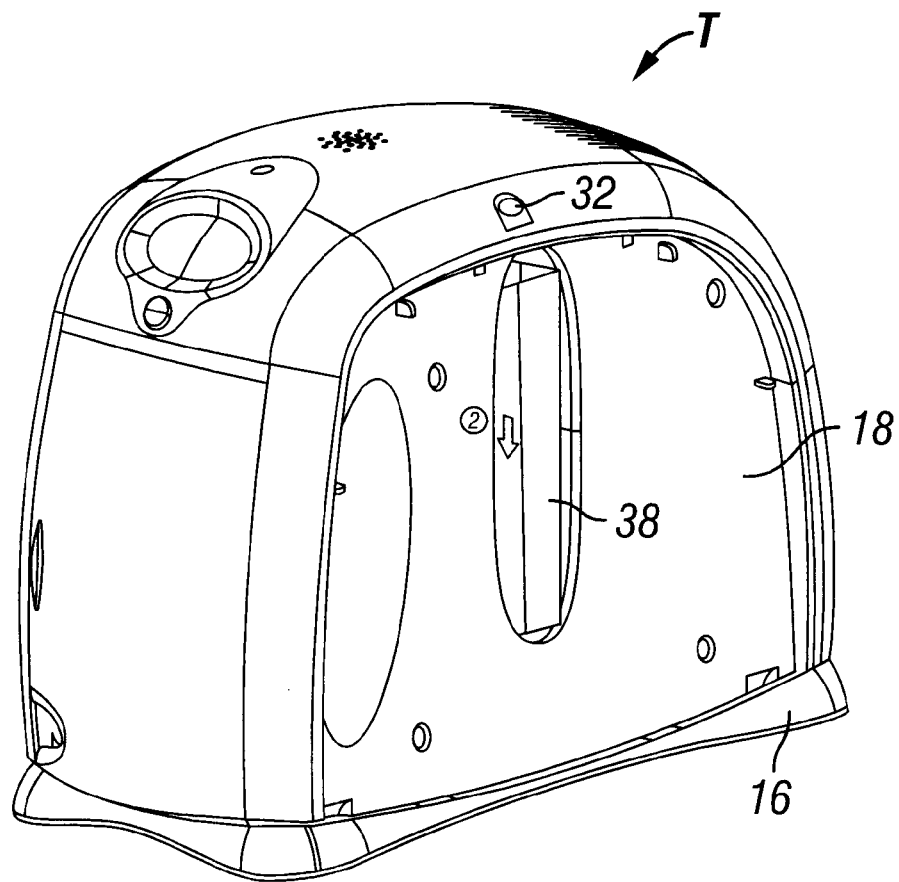
FIG. 8 is a view similar to FIGS. 6 and 7, further showing a blocking member for blocking access to the memory card.

Turning now to FIG. 8, it is contemplated that a blocking member 38 will be provided over memory card 24 and memory card slots 20 for blocking uninvited access to the memory card 24, particularly for display purposes in stores. The blocking member 38 is sized to be disposed between the memory card 24 and the metal shield 33 when the cover panel 12A is attached to the system unit T.

Figure 10:
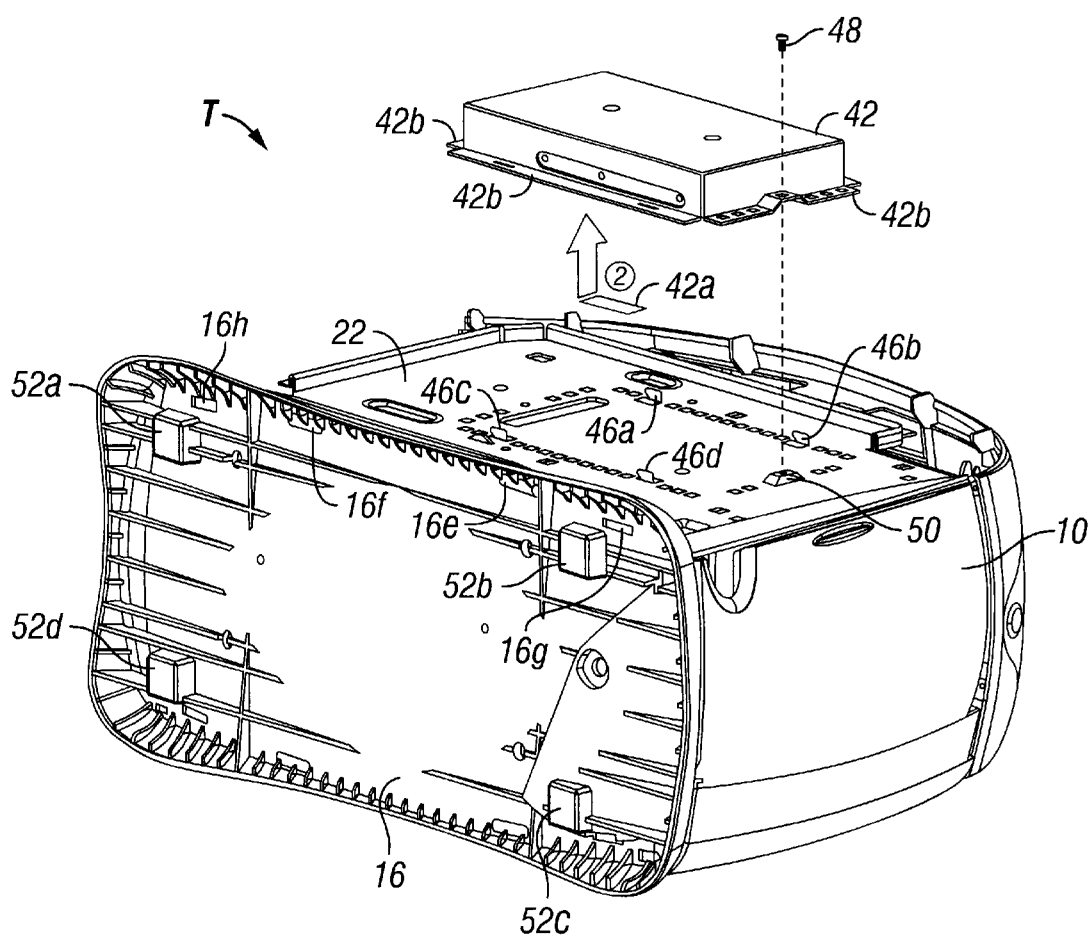
FIG. 10 is an exploded view of the tower unit positioned on one of its sides to show the alignment of the hard drive assembly with the frame.

Turning to FIG. 9, the other side of the system unit T includes a mask 40 having openings 40A and 40B. Opening 40A allows access to a hard drive assembly 42 and opening 40B allows access to PCI slots 44 attached to the motherboard or system board, as disclosed below in detail. As best shown in FIG. 10, preferably the hard drive assembly 42 could be removed by unfastening a screw 48 having a Phillips head and then the hard drive assembly 42 is slid in the direction indicated by the arrow labeled 42A so that the slots in the outwardly radially extending border 42B of the hard drive assembly 42 would clear four tabs 46A, 46B, 46C, and 46D of frame 22. Ribbon connectors and other wired connectors (not shown) can then be disconnected from the old hard drive assembly 42 and reconnected to the upgraded or replacement hard drive assembly 42, the new hard drive assembly 42 slidably connected to the tabs 46A, 46B, 46C and 46D and the screw 48 fastened to prevent inadvertent sliding movement of the hard drive assembly 42 from the frame 22. No EMI shield is required for the hard drive assembly 42, as the hard drive assembly 42 is already properly shielded. As best seen in FIGS. 9 and 10, the slots in the border 42B of the hard drive assembly 42 are aligned with the tabs 46A, 46B, 46C and 46D, and the screw 48 is received through an opening in the border 42B of the hard drive assembly 42 to a threaded opening in member 50 of frame 22.

As best shown in FIGS. 10 to 13, the base 16 includes rubber feet 52A, 52B, 52C and 52D to increase friction between the system unit T and its support. Turning to FIG. 11, even though the slots 44A, 44B and 44C are shown facing from the rear of the system unit T in FIG. 9, preferably the slots, in this case, PCI slots, are facing outwardly from board 43. The three PCI slots 44A, 44B and 44C are attached to the board 43 and are oriented so that they extend outwardly as is contemplated in the preferred embodiment. The PCI slots 44A, 44B and 44C are designed to accept cards, such as modem cards.

Figure 12:
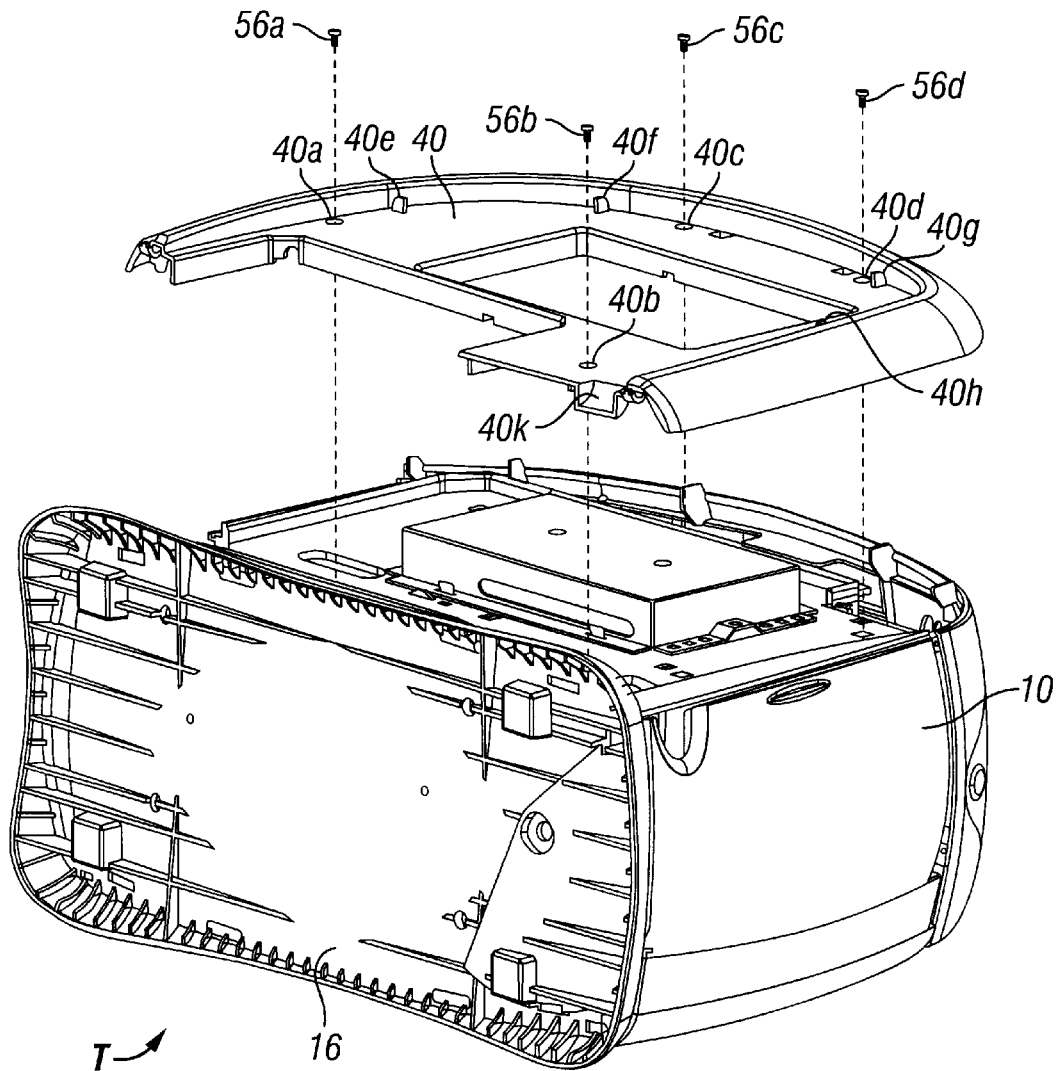
FIG. 12 is a view similar to FIGS. 10 and 11, showing an exploded view of the two openings of the mask relative to the hard drive assembly attached to the frame.
Figure 18:
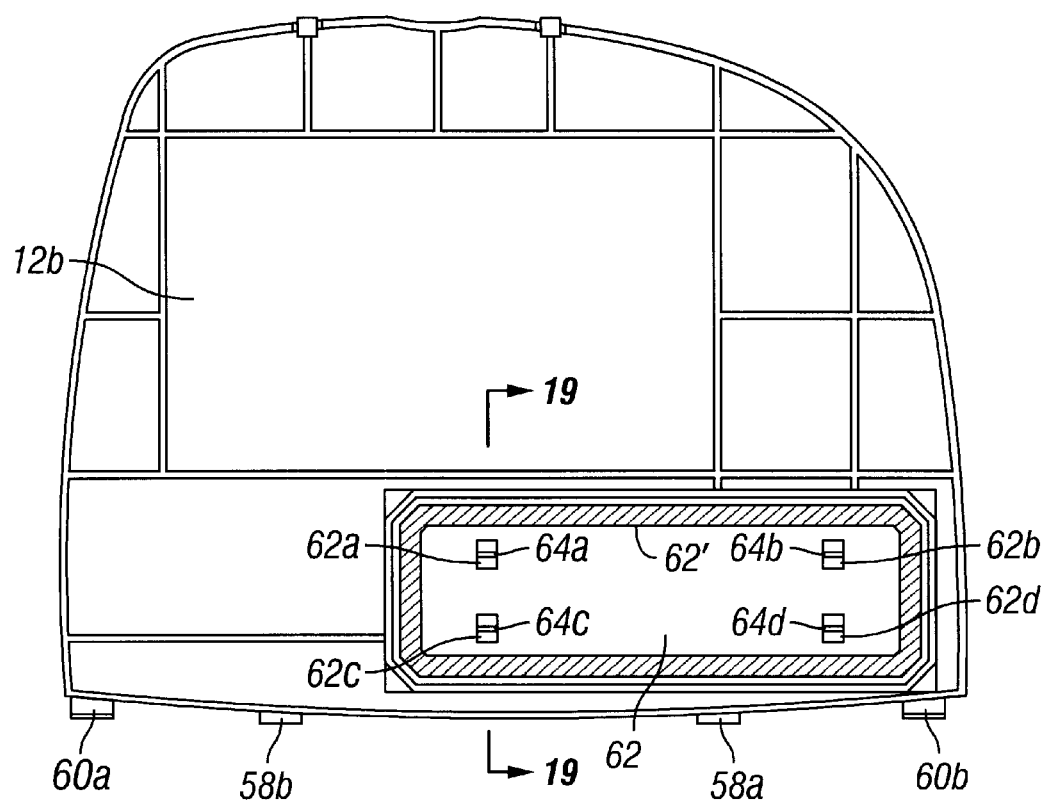
FIG. 18 is an enlarged detail view of the inside of the access cover panel having a shield for the PCI slots.

Turning now to FIG. 12, while the mask 40 is shown in an exploded view, the mask 40 would be attached by metal screws 56A, 56B, 56C and 56D into counterbored holes 40A, 40B, 40C, and 40D, respectively, in the mask 40. These metal screws would be received into threaded bores in the frame 22, similar to the attachment of mask 18 to frame 22. As best shown in FIGS. 12, 18 and 19, mask 40 includes alignment tabs 40E, 40F, 40G and 40H, and panel 12B includes pivot tabs 58A and 58B to be received in indentations 16E and 16F in base 16, and alignment tabs 60A and 60B to be received in openings 16G and 16H, respectively, in base 16. As best shown in FIGS. 12 and 19, the curved tab 60B corresponds to the indentation 40K in mask 40.

Turning now to FIG. 13, a subassembly 22' of the frame 22 is shown removed. Similar in function to the metal shield 33 attached to panel 12A a metal shield 62 is attached to panel 12B, as best shown in FIGS. 18 and 19, and is sized to cover and to engage around the metal portion 22" of the frame 22, as best shown in FIG. 13. The metal shield 62 reduces EMI similarly to the metal shield 33. The metal shield 62 is a generally flat, rectangular sheet having tabs 62' at its edge to provide a compression fit with the surface 22" of the frame 22. The metal shield 62 is attached to plastic members 64A, 64B, 64C and 64D that are monolithically molded to the panel 12B. Metal fingers 62A, 62B, 62C and 62D provide a binding fit with plastic members 64A, 64B, 64C and 64D, respectively. Turning now to FIG. 9, the mechanism for the button 66 is similar to the mechanism for the button 32, as shown in FIGS. 6, 14 and 15.

Use and Operation

As can now be seen, the access cover panels 12A and 12B can be quickly and easily released from the system unit T by pushing the buttons 32 and 66, respectively. Once released, the panels pivot outwardly until the metal shields 33 and 62 clear to allow the panels to be lifted upwardly and outwardly for separation from the unit T. As best shown in FIG. 6, the removal of panel 12A exposes mask 18 having an opening 18A to indicate access to the memory card slots 20 for receiving memory card 24 while masking other electronic components. This mask 18, while indicating to a user the predetermined electronic component area, also eliminates other components from the view of the user to provide a comfort level to the user that the desired upgrading or replacement is within their capabilities and damage will not occur to the system unit T if the user follows the instructions. Similarly, the opening of panel 12B will expose mask 40 to indicate access to the hard drive assembly 42 and PCI slots 44A, 44B and 44C in openings 40A and 40B, respectively, of mask 40. Mask 40 therefore also indicates to the user the predetermined electronic component areas for upgrading or replacement. For example, the hard drive assembly 42, as best shown in FIGS. 9, 10 and 12, can be replaced by removing the screw 48, sliding the hard drive assembly 42 relative to the frame 22, disconnecting ribbon connectors and other wired connectors, connecting a new hard drive assembly 42, sliding the new hard drive assembly 42 back and fastening the screw 48—all within the capabilities of the user. Likewise, upon removal of panel 12B and simultaneously disengagement of the metal shield 62 positioned relative to the opening 40B in the mask 40 and engaging section 22" of frame 22, as best shown in FIG. 13, the user can gain access to any of the PCI slots 44A, 44B or 44C for upgrading or replacement of electronic components. In particular, a modem card (not shown) can be inserted in one of the PCI slots 44A, 44B or 44C, as desired by the user. Preferably, labels (not shown) having instructions for the user will be affixed to the face of the masks 18 and 40.

The present invention facilitates user-friendly servicing of predetermined components of a computer system while maintaining the desired EMI shielding and eliminating concerns by the user of inadvertent contact with other electronic components.

The foregoing disclosure and description of the invention are illustrative and explanatory thereof, and various changes in the details of the illustrated apparatus and construction and method of operation may be made without departing from the spirit of the invention.

What is claimed is:

1. System for use with a computer, comprising:
    a frame for attaching a plurality of electronic components including a predetermined electronic component,
    a cover for covering said electronic components, and
    a mask, said mask disposed between said frame and said cover and masking the plurality of electronic components, said mask comprising:
        an opening, the opening allowing access only to said predetermined electronic component.

2. System of claim 1 wherein said electronic component is a slot for a card.

3. System of claim 1 wherein said electronic component is a hard drive assembly.

4. System of claim 1 wherein said electronic component is a slot for a memory card.

5. System of claim 1 wherein said cover includes an access cover panel.

6. System of claim 5 wherein access cover panel is released using a single button and pivoted for removal from said frame.

7. System of claim 6 further comprising an open hinge to allow said cover panel to be separated from said cover after said access cover panel is pivoted.

8. System of claim 5 wherein said access cover panel is fabricated in one piece and includes alignment tabs, pivot tabs and snaps for attaching said cover panel to said cover.

9. System of claim 5 wherein said access cover panel includes a shield for simultaneously shielding said predetermined electronic component while attaching said access cover panel to said cover.

10. System of claim 9 further comprising a blocking member for blocking access to said predetermined electronic component wherein said blocking member is disposed between said predetermined electronic component and said shield.

11. System of claim 9 wherein said cover and said mask are fabricated from plastic.

12. System of claim 11 wherein said shield is fabricated from metal.

13. System of claim 1 wherein said cover includes a shield, said shield reducing electromagnetic interference.

14. Method for accessing an electronic component attached to a frame in a computer, comprising the steps of:
    releasing a cover panel from a cover,
    masking electronic components in the computer while said cover panel is released; and
    accessing a predetermined electronic component in the computer while performing the step of masking electronic components.

15. Method of claim 14 where the step of releasing a cover panel comprises the steps of:
    activating a button, and
    pivoting said cover panel from said cover after the step of activating.

16. Method of claim 14 further comprising the step of:
    indicating a predetermined electronic component area by positioning said predetermined electronic component in an opening of the mask.

17. System for use with a computer, comprising
    a frame for attaching a plurality of electronic components including predetermined electronic components,
    a cover for covering said electronic components, and
    a plurality of masks, each mask positioned on one of two opposed sides of said frame, each of said masks disposed between said frame and said cover and masking the plurality of electronic components, each mask comprising:
        an opening allowing access only to a predetermined electronic component.

18. System of claim 17 wherein said cover includes two plastic access cover panels.

19. System of claim 18 wherein each access cover panel is released by activating a single button and pivoted for removal.

20. System of claim 18 wherein each of said access cover panels includes a shield for simultaneously shielding said predetermined electronic component while attaching said panel to said cover.

* * * * *